United States Patent
Xie et al.

(10) Patent No.: US 9,009,710 B2
(45) Date of Patent: Apr. 14, 2015

(54) DETECTING DEADLOCKED FILE TRANSFER PROTOCOL UPLOAD CONNECTIONS AND PERFORMING SESSION SELF-RECOVERY USING INFORMATION STORED IN A FIFO RESOURCE ARRAY

(75) Inventors: Xingfeng Xie, Shenzhen (CN); Sujian Liu, Shenzhen (CN); Hua Chen, Shenzhen (CN); Ping Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 345 days.

(21) Appl. No.: 13/258,312

(22) PCT Filed: May 25, 2010

(86) PCT No.: PCT/CN2010/073194
§ 371 (c)(1),
(2), (4) Date: May 29, 2012

(87) PCT Pub. No.: WO2010/148882
PCT Pub. Date: Dec. 29, 2010

(65) Prior Publication Data
US 2012/0240119 A1    Sep. 20, 2012

(30) Foreign Application Priority Data
Dec. 7, 2009    (CN) .......................... 2009 1 0254305

(51) Int. Cl.
*G06F 11/00*    (2006.01)
*G06F 11/07*    (2006.01)
(Continued)

(52) U.S. Cl.
CPC ............... *H04L 67/06* (2013.01); *H04L 69/40* (2013.01); *H04L 67/00* (2013.01);
(Continued)

(58) Field of Classification Search
None
See application file for complete search history.

(56) References Cited

U.S. PATENT DOCUMENTS 6,609,213 B1 *  8/2003  Nguyen et al. ............... 714/4.12
6,763,479 B1 *  7/2004  Hebert ......................... 714/4.11
(Continued)

FOREIGN PATENT DOCUMENTS

| CN | 1831779 A | 9/2006 |
|---|---|---|
| CN | 1904852 A | 1/2007 |
| CN | 101272402 A | 9/2008 |

OTHER PUBLICATIONS

International Search Report in international application No. PCT/CN2010/073194, mailed on Sep. 16, 2010.
(Continued)

*Primary Examiner* — Adam Lee
*Assistant Examiner* — Benjamin Wu
(74) *Attorney, Agent, or Firm* — Oppedahl Patent Law Firm LLC

(57) ABSTRACT

A method and a device for file transfer protocol (FTP) deadlock detection and self recovery are provided by the disclosure in order to solve the sudden deadlock problem in the FTP upload task. The method includes: if a daemon determines that a deadlock occurs in an FTP upload task by a heartbeat detection mechanism, the socket resources used by the FTP upload task is recorded at the storage location in a socket resource cycle queue, and a process of ending the FTP upload task is started; determining whether the socket resource cycle queue is full, if it is not full, the socket resources used by the FTP upload task in the current deadlock is put into the socket resource cycle queue, otherwise, the earliest socket resources in the socket resource cycle queue are released, and the socket resources used by the FTP upload task in the current deadlock is put into the socket resource cycle queue.

9 Claims, 4 Drawing Sheets

(51) Int. Cl.
*G06F 11/30* (2006.01)
*H04L 12/26* (2006.01)
*H04L 29/08* (2006.01)
*H04L 29/14* (2006.01)
*H04L 29/06* (2006.01)

(52) U.S. Cl.
CPC .......... *H04L 65/1066* (2013.01); *H04L 43/00* (2013.01); *G06F 11/07* (2013.01); *H04L 43/08* (2013.01); *H04L 43/0811* (2013.01)

(56) References Cited

U.S. PATENT DOCUMENTS

| | | | |
|---|---|---|---|
| 7,010,657 B2 | 3/2006 | Lowe et al. | |
| 7,076,555 B1* | 7/2006 | Orman et al. | 709/227 |
| 7,159,234 B1* | 1/2007 | Murphy et al. | 725/87 |
| 7,433,943 B1* | 10/2008 | Ford | 709/223 |
| 7,703,077 B2 | 4/2010 | Rehof et al. | |
| 7,831,686 B1* | 11/2010 | Tran et al. | 709/217 |
| 7,962,623 B2* | 6/2011 | Undery et al. | 709/227 |
| 8,365,018 B2* | 1/2013 | McIntosh et al. | 714/23 |
| 2002/0087912 A1* | 7/2002 | Kashyap | 714/13 |
| 2003/0204641 A1 | 10/2003 | Rehof et al. | |
| 2004/0042412 A1* | 3/2004 | Fan | 370/252 |
| 2004/0044771 A1* | 3/2004 | Allred et al. | 709/227 |
| 2004/0085894 A1* | 5/2004 | Wang et al. | 370/216 |
| 2005/0021915 A1 | 1/2005 | Lowe et al. | |
| 2005/0132030 A1* | 6/2005 | Hopen et al. | 709/223 |
| 2006/0159011 A1* | 7/2006 | Dalal et al. | 370/220 |
| 2006/0190948 A1* | 8/2006 | Burger et al. | 719/314 |
| 2006/0271681 A1* | 11/2006 | Apreutesei et al. | 709/226 |
| 2007/0005773 A1* | 1/2007 | Apreutesei et al. | 709/227 |
| 2007/0189316 A1* | 8/2007 | Qing et al. | 370/412 |
| 2007/0288645 A1* | 12/2007 | Kass | 709/230 |
| 2008/0025226 A1* | 1/2008 | Mogul et al. | 370/242 |
| 2008/0104252 A1* | 5/2008 | Henniger | 709/227 |
| 2008/0129464 A1* | 6/2008 | Frey et al. | 340/146.2 |
| 2008/0133712 A1* | 6/2008 | Friedman et al. | 709/218 |
| 2008/0313339 A1* | 12/2008 | Faucher et al. | 709/227 |
| 2009/0037998 A1* | 2/2009 | Adhya et al. | 726/11 |
| 2010/0149996 A1* | 6/2010 | Sun | 370/244 |

OTHER PUBLICATIONS

English Translation of the Written Opinion of the International Search Authority in international application No. PCT/CN2010/073194, mailed on Sep. 16, 2010.

* cited by examiner

DETECTING DEADLOCKED FILE TRANSFER PROTOCOL UPLOAD CONNECTIONS AND PERFORMING SESSION SELF-RECOVERY USING INFORMATION STORED IN A FIFO RESOURCE ARRAY

TECHNICAL FIELD

The present disclosure relates to the File Transfer Protocol (FTP) technology in the technical field of communications, particularly to a method and a device for FTP deadlock detection and self recovery.

BACKGROUND

In mobile communication equipment, data collected from base station equipment comprise performance data of the base station, detailed information data of each call, alarm data and baseband grasping frame data and so on; the collected data have features such as large volume, real-time property, continuity and so on. The base station is connected with an Operation Maintenance Centre (OMC) through the Ethernet, and an FTP with high data throughput is the first choice for data uploading. An Ethernet network environment is complex and FTP underlying protocol processing in a vxWorks real-time operation system produced by the Wind River System Inc. is unstable, therefore, such cases as close, write, read, select, abnormal deadlock or apparent death may suddenly occur in an FTP upload operation, which are characterized in that socket resources (a control connection socket and a data connection socket) cannot be released within operation time allowed by an operation system and exit this system scheduling, therefore, process scheduling of the real-time operation system goes out of control, a single board is reset, and robustness of the base station equipment is seriously affected; in view of this, it becomes very important to perform deadlock detection and deadlock recovery to the FTP upload operation.

With regard to deadlock detection of a process, the patent Method for detecting a deadlock on Semaphore (CN200510053781) describes whether a deadlock happens to semaphore is detected by the establishment of a list of relationships between processes and semaphore and according to whether a resource wait loop determination condition exists, so as to obtain the process corresponding to the semaphore to which a deadlock happens. The disadvantage of the patent is: a deadlock can not be determined until a resource wait loop appears; for an FTP upload operation, sudden apparent death of a process, which occurs due to network environment factors, cannot be detected.

SUMMARY

The present disclosure provides a method and a device for FTP deadlock detection and self recovery, which can solve the problem of a sudden deadlock in an FTP upload task.

A method for FTP deadlock detection and self recovery in a communication system, which is provided by an embodiment of the present disclosure, includes the following steps:
    determining, by a daemon configured in a network element, whether a deadlock occurs in an FTP upload task through a heartbeat detection mechanism, if the deadlock occurs, then recording socket resources used by an FTP upload task at a storage location in an socket resource cycle queue which is created in the network element, and starting a process of ending the FTP upload task; and
    determining whether the socket resource cycle queue is full, if it is not full, then putting socket resources used by the FTP upload task in the current deadlock into the socket resource cycle queue, if it is full, then releasing earliest socket resources from the socket resource cycle queue, and putting the socket information used by the FTP upload task in the current deadlock into the socket resource cycle queue.

In the abovementioned method, the step of determining by the daemon whether a deadlock occurs in the FTP upload task through the heartbeat detection mechanism may include:
    A1: transmitting, by the daemon, a heartbeat detection message to the FTP upload task periodically, and determining whether a response message of the heartbeat detection message is received within a certain period of time, if the response message is received, then resetting a heartbeat detection timer, and returning to step A1; otherwise, executing step A2;
    A2: adding 1 to a heartbeat failure counter, and determining whether a value of the heartbeat failure counter is greater than a preset value, if the value is greater than the preset value, then determining that the deadlock occurs in the FTP upload task; otherwise, executing step A1.

In the abovementioned method, after determining that the deadlock occurs in the FTP upload task, the method may further include: resetting the heartbeat failure counter by the daemon, and returning to step A1 to initiate heartbeat detection in a next cycle, wherein a task priority to which the daemon belongs is higher than that of the FTP upload task, and the socket resources include a data connection socket, and/or a control connection socket.

Correspondingly, the present disclosure further provides a device for FTP deadlock detection and self recovery in a communication system, including: a heartbeat detection initiating module and a buffer queue managing module, wherein
    the heartbeat detection initiating module is configured to determine whether a deadlock occurs in an FTP upload task through an heartbeat detection mechanism; the buffer queue managing module is configured to record socket resources used by an FTP upload task at a storage location in an assigned socket resource cycle queue, start a process of ending the FTP upload task, and further configured to determine whether the socket resource cycle queue is full, if it is not full, then put socket resources used by the FTP upload task in the current deadlock into the socket resource cycle queue, if it is full, then release earliest socket resources from the socket resource cycle queue, and put the socket resources used by the FTP upload task in the current deadlock into the socket resource cycle queue.

In the abovementioned device, the heartbeat detection initiating module may include: a transmitting module and a determining module, wherein the transmitting module is configured to transmit a heartbeat detection message to the FTP upload task periodically; the determining module is configured to determine whether a response message of the heartbeat detection message is received within a certain period of time, if the response message is received, then reset a heartbeat detection timer, and notify the transmitting module to periodically transmit a heartbeat detection message to the FTP upload task, if the response message is not received, then add 1 to a heartbeat failure counter; and the determining module is further configured to determine whether a value of the heartbeat failure counter is greater than a preset value, if the value is greater than the preset value, then determine that the deadlock occurs in the FTP upload task, otherwise, periodically transmit a heartbeat detection message to the FTP upload task;

wherein the buffer queue managing module can be further configured to notify the determining module to reset the heartbeat failure counter after determining that the deadlock occurs in the FTP upload task; wherein a task priority to which the daemon belongs is higher than that of the FTP upload task; the socket resources include a data connection socket, and/or a control connection socket.

Correspondingly, the present disclosure further provides a system for FTP deadlock detection and self recovery, including: a daemon configured to determine that a deadlock occurs in an FTP upload task through a heartbeat detection mechanism, and then record socket resources used by an FTP upload task at a storage location in an assigned socket resource cycle queue, and start a process of ending the FTP upload task; and further configured to determine whether the socket resource cycle queue is full, if it is not full, then put socket used by the FTP upload task in the current deadlock into the socket resource cycle queue, otherwise, release earliest socket resources from the socket resource cycle queue, and put the resources used by the FTP upload task in the current deadlock into the socket resource cycle queue; an FTP upload task until configured to return a heartbeat response to the heartbeat detection of the daemon, acquire data from the demon, establish a connection the FTP and upload the acquired data to an FTP server;

a socket resource cycle queue configured to store socket resources used by the FTP upload task each time a deadlock occurs; and an FTP server configured to receive data uploaded by the FTP upload task.

In the abovementioned system, the daemon may include: a heartbeat detection initiating module configured to determine weather the deadlock occurs in the FTP upload task through the heartbeat detection mechanism; a buffer queue managing module configured to record the socket resources used by the FTP upload task at the storage location in the assigned socket resource cycle queue, and start the process of ending the FTP upload task; and further configured to determine whether the socket resource cycle queue is full, if it is not full, then put the socket resources used by the FTP upload task in the current deadlock into the socket resource cycle queue, if it is full, then release the earliest socket resources from the socket resource cycle queue, and put the socket resources used by the FTP upload task in the current deadlock into the socket resource cycle queue.

Compared with the prior art, embodiments of the present disclosure provide a method for detecting a deadlock by adopting a heartbeat detection mechanism, a method of releasing socket resources with delay from a socket resource cycle queue when a deadlock occurs, a self recovery method and the like. By adopting a heartbeat detection mechanism and a self recovery scheme in the embodiments of the present disclosure, problems, such as detection of a sudden deadlock in an FTP upload task, are solved, thereby abnormal resetting of a base station single board is decreased, this operation stability of base station equipment is improved, and the impact to system CPU, when a sudden situation appears, is decreased.

DETAILED DESCRIPTION

Figure 1:
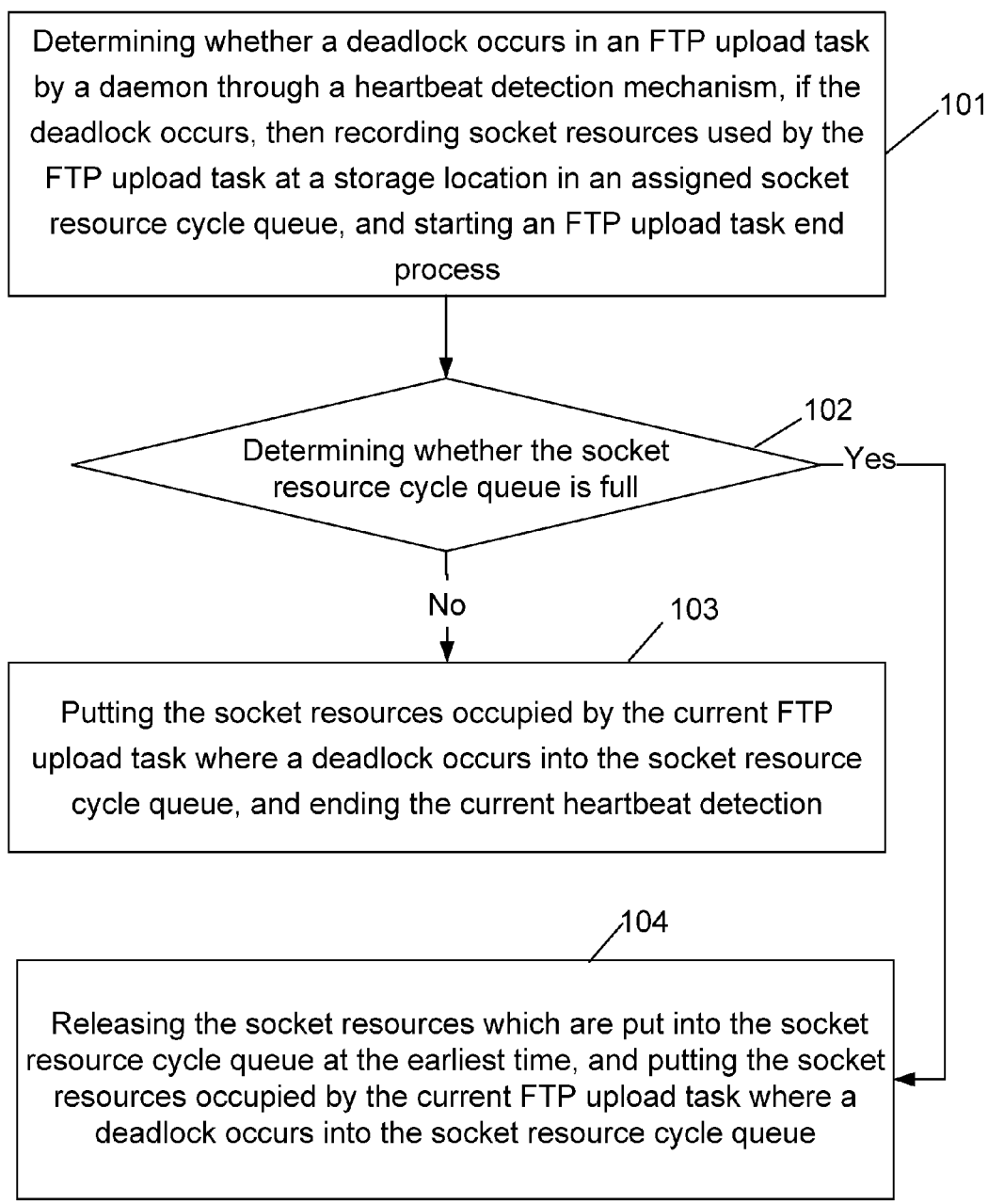
FIG. 1 shows a flowchart of a method for FTP deadlock detection and self recovery according to an embodiment of the present disclosure.

As shown in FIG. 1, a method for FTP deadlock detection and self recovery according to an embodiment of the present disclosure comprises the following steps:

step 101: determining by a daemon whether a deadlock occurs in an FTP upload task through a heartbeat detection mechanism, if the deadlock occurs, then recording socket resources used by the FTP upload task at a storage location in an assigned socket resource cycle queue, and starting a process of ending the FTP upload task;

wherein, the socket resource cycle queue is a first-in first-out (FIFO) array which is created in an operation system of a network element communication equipment in the embodiment; after the deadlock occurs in the FTP upload task, the socket resources used by the FTP upload task in which the deadlock occurs are placed at the head of the socket resource cycle queue, and after a certain delay, the socket resources, used by the FTP upload task in which the deadlock occurs, are released;

here, after the initialization is completed, the step that the daemon configured in the network element communication equipment determines whether a deadlock occurs in the FTP upload task through the heartbeat detection mechanism can be implemented in this way:

step A1: transmitting by the daemon a heartbeat detection message to the FTP upload task periodically, and determining whether a response message (ACK) of the is heartbeat detection message is received within a certain period of time, if the ACK is received, then resetting a heartbeat detection timer, and returning to step A1; otherwise, executing step A2; and step A2: adding 1 to a heartbeat failure counter, and determining whether a value of the heartbeat failure counter is greater than a preset value, if the value is greater than the preset value, determining that the deadlock occurs in the FTP upload task; otherwise, executing step A1;

after determining that the deadlock occurs in the FTP upload task, the daemon can reset the heartbeat failure counter, and step A1 is executed to initiate heartbeat detection in a next cycle;

the socket resources may comprise a data connection socket, and/or a control connection socket;

step 102: determining whether the socket resource cycle queue is full, if it is not full, executing step 103; if it is full, executing step 104;

step 103: putting the socket resources used by the FTP upload task in the current FTP upload task with the deadlock into the socket resource cycle queue, and ending the current heartbeat detection;

wherein the socket resources used by FTP upload task in the current FTP upload task with the deadlock are put into the head of the socket resource cycle queue; according to the FIFO principle, the socket resources in the head of the queue can be released when cycling to the tail of the queue;

step 104: releasing socket resources which are put into the socket resource cycle queue at the earliest time, and putting the socket resources used by the FTP upload task in the current FTP upload task with the deadlock into the socket resource cycle queue.

After determining that the deadlock occurs in the FTP upload task, the daemon can reset the heartbeat failure counter, so as to initiate heartbeat detection in a next cycle.

It should be noted that, a task priority to which the daemon belongs is higher than that of the FTP upload task.

Figure 2:
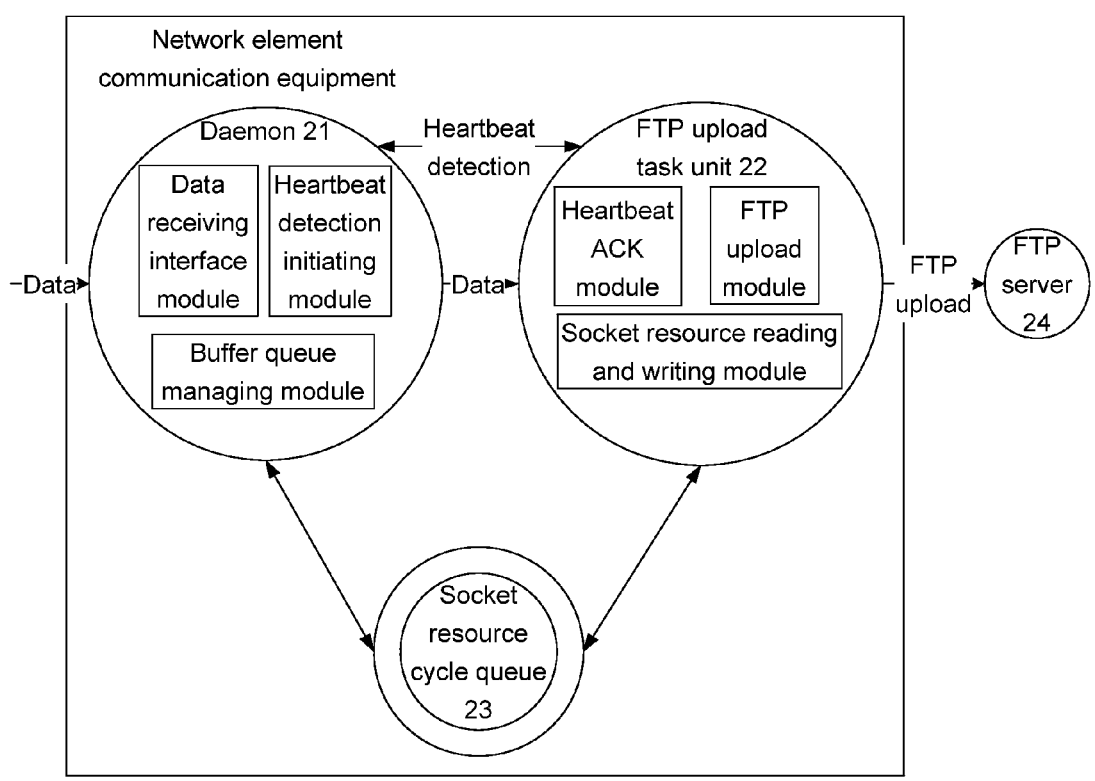
FIG. 2 shows a structural diagram of a system for FTP deadlock detection and self recovery according to an embodiment of the present disclosure.

Correspondingly, the present disclosure further provides an embodiment of a system for FTP deadlock detection and self recovery; as shown in FIG. 2, the system comprises: a daemon 21, an FTP upload task unit 22, a socket resource cycle queue 23 and an FTP server 24, wherein, the daemon 21 comprises: a data receiving interface module for collecting data information, a heartbeat detection initiating module with function of initiating heartbeat detection, a module with function of deadlock determination and recovery, a buffer queue managing module with function of managing FTP socket resources, and so on;

the FTP upload task unit 22 is configured to implement basic operations including establishing a control connection and a data connection with the FTP server and uploading FTP data, and further configured to respond to a heartbeat detection message of the daemon 21 and return a response message, and further to acquire data from the daemon, establish a connection with the FTP and upload the acquired data to the FTP server;

the socket resource cycle queue 23 is configured to store socket resources used by an FTP upload task each time a deadlock occurs, such as FTP control connection socket resources and data connection socket resources which are used each time a deadlock occurs; and the FTP server 24 is configured to receive data uploaded by the FTP upload task.

Furthermore, the FTP upload task unit 22 comprises: a heartbeat ACK module, a socket resource reading and writing module with function of reading and storing when socket resources are recovered, and an FTP upload module; wherein the heartbeat ACK module sends direct feedback according to a heartbeat detection message initiated by a heartbeat; however, if an FTP upload task is being executed at the time, the heartbeat ACK module cannot respond to the heartbeat detection messages because it cannot be scheduled; each time initialization is carried out, the socket resource reading and writing module delays releasing according to earliest historical FTP deadlock information which is read by the socket resource cycle buffer queue managing module and socket information related to socket resources; the FTP upload task unit 22 reads data stored by the data receiving message interface, establishes a connection with the FTP server, and at the same time, stores the socket information related to socket resources and writes the socket information into a queue node assigned by the socket resource cycle buffer queue managing module.

Specifically, the daemon 21 is configured to determine whether a deadlock occurs in the FTP upload task through a heartbeat detection mechanism, if the deadlock occurs, the socket resources used by the FTP upload task are recorded at the storage location in the assigned socket resource cycle queue, and process of ending the FTP unload task is started; the daemon 21 is further configured to determine whether the socket resource cycle queue is full, if it is not full, socket resources used by the FTP upload task in the current deadlock is put into the socket resource cycle queue, if it is full, the earliest socket resources in the socket resource cycle queue are released, and the socket resources used by the FTP upload task in the current deadlock is put into the socket resource cycle queue.

It should be noted that, the daemon 21 is corresponding to a device for FTP deadlock detection and self recovery according to an embodiment of the present disclosure; the device mainly comprises: a heartbeat detection initiating module and a buffer queue managing module, wherein the heartbeat detection initiating module is configured to determine whether a deadlock occurs in an FTP upload task through the heartbeat detection mechanism;

the buffer queue managing module is configured to record socket resources used by an FTP upload task at the storage location in an assigned socket resource cycle queue, and start a process of ending the FTP upload task; the buffer queue managing module is further configured to determine whether the socket resource cycle queue is full, if it is not full, socket resources used by the FTP upload task in the current deadlock is put into the socket resource cycle queue, otherwise, the earliest socket resources in the socket resource cycle queue are released, and socket resources used by the FTP upload task in the current deadlock is put into the socket resource cycle queue.

In the abovementioned device, the heartbeat detection initiating module comprises: a transmitting module and a determining module, wherein the transmitting module is configured to transmit a heartbeat detection message to an FTP upload task periodically; the determining module is configured to determine whether an ACK of the heartbeat detection message is received within a certain period of time, if the ACK is received, then reset a heartbeat detection timer, and notify the transmitting module to periodically transmit a heartbeat detection message to the FTP upload task, if the ACK is not received, then add 1 to a heartbeat failure counter, and determine whether a value of the heartbeat failure counter is greater than a preset value, if the value is greater than the preset value, then determine the deadlock occurs in the FTP upload task, if the value is not greater than the preset value, the determining module periodically transmits a heartbeat detection message to the FTP upload task.

In the abovementioned device, the buffer queue managing module can be further configured to notify the determining module to reset the heartbeat failure counter after determining that the deadlock occurs in the FTP upload task.

Here, it should be explained that, the task priority to which the daemon belongs is higher than that of the FTP upload task.

The method, device and system for FTP deadlock detection and self recovery which are provided by the present disclosure are described briefly above. The technical solution of the present disclosure is described below with reference to specific embodiments.

Embodiment 1

Figure 3:
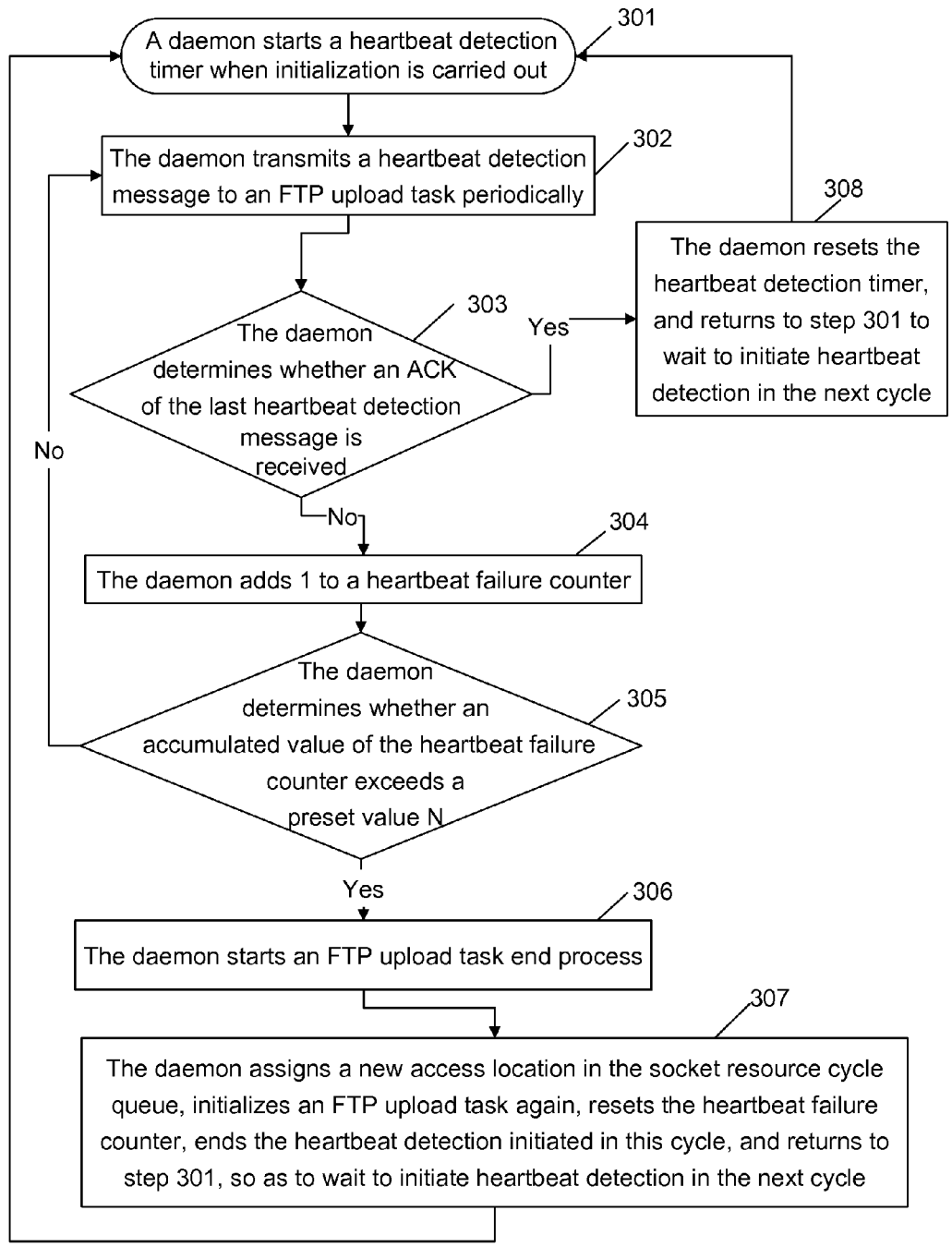
FIG. 3 shows a flowchart of heartbeat detection and self recovery according to an embodiment of the present disclosure.

As shown in FIG. 3, the main process of implementing FTP deadlock detection and self recovery according to an embodiment of the present disclosure comprises the following steps:

step 301: the daemon starts the heartbeat detection timer when initialization is performed;

step 302: the daemon transmits a heartbeat detection message to an FTP upload task periodically;

step 303: the daemon determines whether an ACK of the last heartbeat detection message is received, if the ACK is received, step 308 is executed, otherwise, step 304 is executed;

step 304: the daemon adds 1 to the heartbeat failure counter;

step 305: the daemon determines whether an accumulated value of the heartbeat failure counter exceeds a preset value N, if the accumulated value does not exceed N, is then step 301 is executed so as to wait for the next cycle to initiate heartbeat detection, if the accumulated value exceeds N, step 306 is executed;

It should be noted that, the heartbeat detection mechanism adopted by the embodiment can monitor a deadlock according to different deadlock determining policies (for example, modifying the value N), instead of taking presence of a semaphore waiting loop as the only basis for determination, thereby not only improving the flexibility of coping with a sudden FTP deadlock on base station equipment, but also decreasing times of resetting a single board in abnormal situation and improving the reliability of the system;

step 306: the daemon starts a process of ending the FTP upload task;

here, by starting the process of ending the FTP upload task, the daemon completely ends the FTP upload task where the deadlock occurs;

step 307: the daemon assigns a new access location in the socket resource cycle queue, initializes the FTP upload task again, resets the heartbeat failure counter, and ends the heartbeat detection initiated in this cycle; and then step 301 is executed, so as to wait for the next cycle to initiate heartbeat detection; and step 308: the daemon resets the heartbeat detection timer, and step 301 is executed, so as to wait for the next cycle to initiate heartbeat detection.

Embodiment 2

Figure 4:
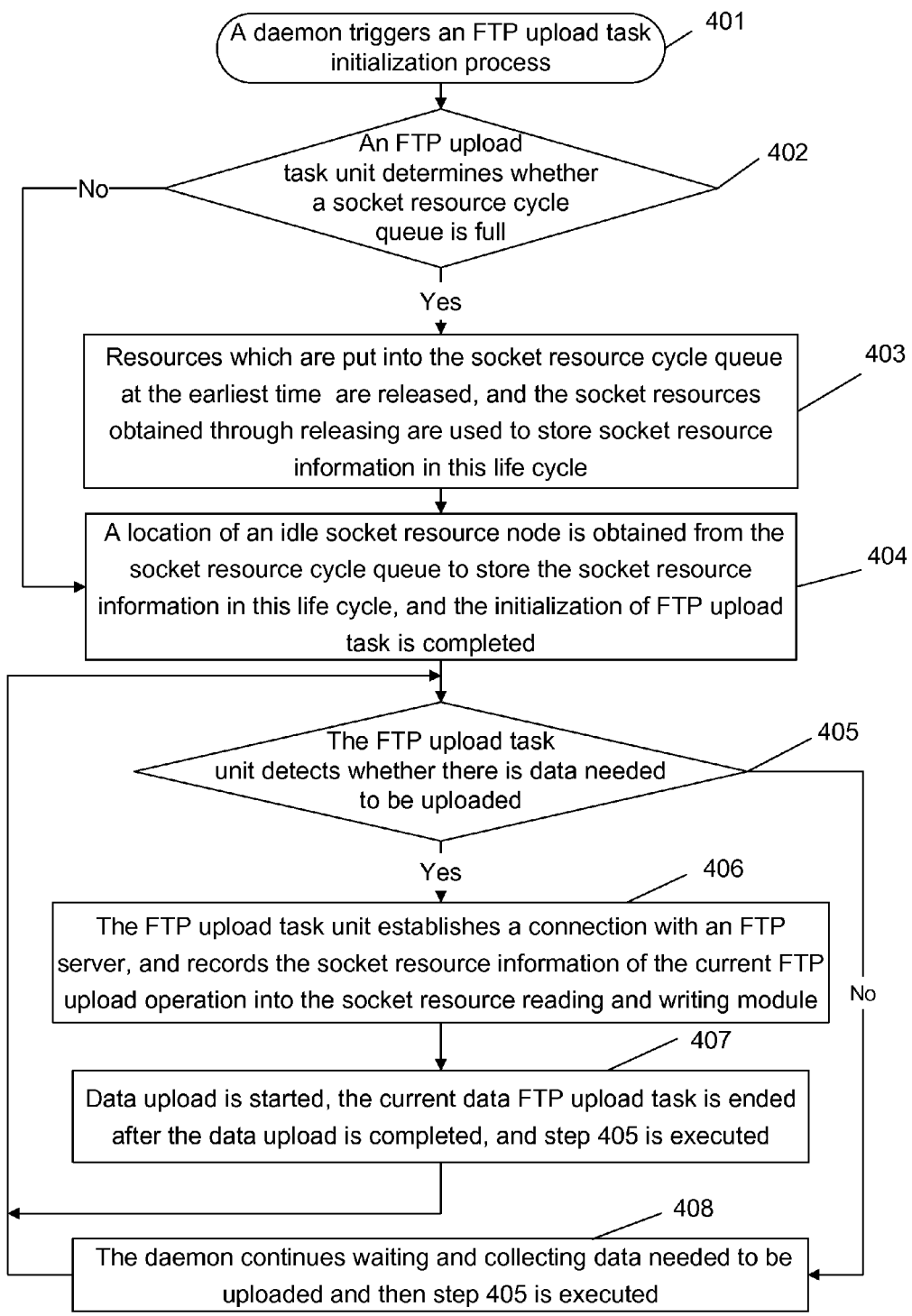
FIG. 4 shows a flowchart of initialization and data upload of an FTP upload task according to an embodiment of the present disclosure.

As shown in FIG. 4, the main process of implementing FTP upload task initialization and data upload according to the present disclosure comprises the following steps:

step 401: the daemon triggers an FTP upload task initialization process;

wherein the FTP upload task initialization process is triggered by the daemon when initialization or deadlock recovery happens;

step 402: the FTP upload task unit determines whether a socket resource cycle queue is full, if it is full, then step 403 is executed; otherwise, step 404 is executed;

step 403: resources which are put into the socket resource cycle queue at the earliest time are released, and the socket resources obtained through releasing are used to store socket resources in this life cycle;

step 404: a location of an idle socket resource node is obtained from the socket resource cycle queue to store the socket resources in this life cycle, then the FTP upload task initialization is completed;

step 405: the FTP upload task unit detects whether there is data needed to be uploaded, if there is such data, then step 406 is executed; otherwise, step 408 is executed;

step 406; the FTP upload task unit establishes a connection with the FTP server, and record the socket resources of the current FTP upload task into the socket resource reading and writing module;

wherein the socket resources of the current FTP upload task is recorded into the socket resource reading and writing module for temporary storage; when the deadlock occurs in the current FTP upload task, the socket resources stored in the socket resource reading and writing module is called, and then the socket resources used by the current upload FTP upload task is out into the socket resource cycle queue;

step 407: data upload is started, after it is completed, the current data FTP upload task is ended, and step 405 is executed; and step 408: the daemon continues waiting and collecting data needed to be uploaded, then step 405 is executed;

wherein the data needed to be uploaded comprise various types of information to be reported, such as network element fault data, service data and the like.

It should be noted that, the FTP upload task is detected and monitored by a heartbeat detection message sent from the daemon in the whole life cycle all the time.

Compared with the prior art, the embodiments of the present disclosure introduce methods such as a method for detecting a deadlock through a heartbeat detection mechanism, a method for releasing socket resources with delay from a socket resource cycle queue when a deadlock occurs, a self recovery method, and the like. Furthermore, the heartbeat detection mechanism can monitor a deadlock, according to different deadlock determining policies (for example, modifying a value N), instead of taking presence of a semaphore waiting loop as the only basis for determination, thus not only improving the flexibility of coping with a sudden FTP deadlock of base station equipment, but also decreasing resetting times of a single board in abnormal situation and improving the reliability of the system. In addition, in the embodiments of the present disclosure, control connection socket resources and data connection socket resources are released with delay when a deadlock occurs, and the possibility of presence of a sudden abnormal situation is reduced, thereby ensuring the total amount of occupied socket resources in a base station system are as well as avoiding socket resources in use from overflowing; at the same time, abnormal data receiving and scheduling at a daemon, which is caused by an abnormal FTP upload task is prevented, thereby reducing the overstocking risk of all process messages of the task to which the daemon belongs, and playing a role of moderating the high utilization ratio of central processing unit (CPU) of a single board.

Obviously, various changes and modifications can be made to the present disclosure by those skilled in the art without departing from the spirit and scope of the present disclosure. Thus, if these modifications and equivalent replacements of the present disclosure are within the scope of the claims of the present disclosure and equal technology thereof, the present disclosure is also intended to include these changes and modifications.

What is claimed is:

1. A method for File Transfer Protocol (FTP) deadlock detection and self-recovery in a network element, comprising:

determining, by a daemon configured in the network element, whether a deadlock occurs in an FTP upload task by periodically transmitting a heartbeat detection message to an FTP upload task unit configured in the network element to perform the FTP upload task;

upon determining that the deadlock occurs in the FTP upload task, recording socket resources used by the deadlocked FTP upload task in a socket resource cycle queue in the network element;

starting a process of ending the deadlocked FTP upload task;

assigning a new access location in the socket resource cycle queue; and initializing the deadlocked FTP upload task again using the new access location, wherein recording socket resources comprises of determining whether the socket resource cycle queue is full, upon determining that the socket resource cycle queue is not full, storing socket resources used by the deadlocked FTP upload task into the socket resource cycle queue, and upon determining that the socket resource cycle queue is full, releasing earliest socket resources from the socket resource cycle queue, and storing the socket resources used by the deadlocked FTP upload task into the socket resource cycle queue, wherein the socket resource cycle queue is implemented as a first-in-first-out (FIFO) array, and the socket resources used by the deadlocked FTP upload task are inserted into a head of the socket resource cycle queue, and wherein socket resources initially inserted in the head of the socket resource cycle queue are later released when cycling to a tail of the socket resource cycle queue, according to an FIFO principle.

2. The method according to claim 1, further comprising:
determining, by the daemon, whether a response message to the heartbeat detection message is received from the FTP upload task unit within a certain period of time;
upon determining that the response message is received within the certain period of time, resetting a heartbeat detection timer and re-transmitting the heartbeat detection message to the FTP upload task unit; and
upon determining that the response message is not received within the certain period of time, incrementing a heartbeat failure counter, and determining whether a value of the heartbeat failure counter is greater than a preset value, and upon determining that the value is greater than the preset value, determining that the deadlock occurs in the FTP upload task.

3. The method according to claim 2, further comprising:
upon determining that the deadlock occurs in the FTP upload task, resetting the heartbeat failure counter and ending the transmission of the heartbeat detection message for the deadlocked FTP upload task.

4. The method according to claim 1, wherein a task priority to which the daemon belongs is higher than that of the FTP upload task.

5. The method according to claim 1, wherein the socket resources comprise a data connection socket, and/or a control connection socket.

6. A device for File Transfer Protocol (FTP) deadlock detection and self-recovery in a network element, comprising:
a memory storing programming instructions; and
a processor configured to execute the stored programming instructions to perform a method comprising:
determining, by a daemon configured in the network element, whether a deadlock occurs in an FTP upload task by periodically transmitting a heartbeat detection message to an FTP upload task unit configured in the network element to perform the FTP upload task;
upon determining that the deadlock occurs in the FTP upload task, recording socket resources used by the deadlocked FTP upload task in a socket resource cycle queue in the network element;
starting a process of ending the deadlocked FTP upload task;
assigning a new access location in the socket resource cycle queue; and
initializing the deadlocked FTP upload task again using the new access location,
wherein recording socket resources comprises of determining whether the socket resource cycle queue is full, upon determining that the socket resource cycle queue is not full, storing socket resources used by the deadlocked FTP upload task into the socket resource cycle queue, and upon determining that the socket resource cycle queue is full, releasing earliest socket resources from the socket resource cycle queue, and storing the socket resources used by the deadlocked FTP upload task into the socket resource cycle queue,
wherein the socket resource cycle queue is implemented as a first-in-first-out (FIFO) array, and the socket resources used by the deadlocked FTP upload task are inserted into a head of the socket resource cycle queue, and
wherein socket resources initially inserted in the head of the socket resource cycle queue are later released when cycling to a tail of the socket resource cycle queue, according to an FIFO principle.

7. The device according to claim 6, wherein the processor is further configured to execute the stored programming instructions to perform the method further comprising:
determining, by the daemon, whether a response message to the heartbeat detection message is received from the FTP upload task unit within a certain period of time;
upon determining that the response message is received within the certain period of time, resetting a heartbeat detection timer and re-transmitting the heartbeat detection message to the FTP upload task unit; and
upon determining that the response message is not received within the certain period of time, incrementing a heartbeat failure counter, and determining whether a value of the heartbeat failure counter is greater than a preset value, and upon determining that the value is greater than the preset value, determining that the deadlock occurs in the FTP upload task.

8. The device according to claim 7, wherein the processor is further configured to execute the stored programming instructions to perform the method further comprising:
upon determining that the deadlock occurs in the FTP upload task, resetting the heartbeat failure counter, and ending the transmission of the heartbeat detection message for the deadlocked FTP upload task.

9. The device according to claim 6, wherein a task priority to which the daemon belongs is higher than that of the FTP upload task, and wherein the socket resources comprise a data connection socket, and/or a control connection socket.

* * * * *